United States Patent
Enjuji

(10) Patent No.: US 8,135,214 B2
(45) Date of Patent: Mar. 13, 2012

(54) IMAGE PROCESSING DEVICE AND METHOD FOR CORRECTING A COLOR OF A SPECIFIC AREA IN AN IMAGE

(75) Inventor: Takayuki Enjuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 867 days.

(21) Appl. No.: 12/200,705

(22) Filed: Aug. 28, 2008

(65) Prior Publication Data

US 2009/0059079 A1 Mar. 5, 2009

(30) Foreign Application Priority Data

Aug. 31, 2007 (JP) ................. 2007-225512

(51) Int. Cl.
*G06K 9/00* (2006.01)
*G03F 3/08* (2006.01)
(52) U.S. Cl. .................. 382/167; 358/518; 358/520
(58) Field of Classification Search .................. 382/167; 358/518–523
See application file for complete search history.

(56) References Cited

U.S. PATENT DOCUMENTS

| | | | |
|---|---|---|---|
| 2005/0008243 A1* | 1/2005 | Fujino | 382/254 |
| 2005/0219587 A1* | 10/2005 | Hayaishi | 358/1.9 |
| 2005/0243186 A1 | 11/2005 | Hayaishi | 348/223.1 |
| 2006/0158704 A1* | 7/2006 | Kameyama | 358/518 |
| 2006/0250412 A1* | 11/2006 | Chen et al. | 345/589 |

FOREIGN PATENT DOCUMENTS

| | | |
|---|---|---|
| JP | 2005-204229 | 7/2005 |
| JP | 2007-036415 | 2/2007 |
| WO | WO 2004/034711 | 4/2004 |

* cited by examiner

*Primary Examiner* — Li Liu
(74) *Attorney, Agent, or Firm* — DLA Piper LLP (US)

(57) ABSTRACT

An image processing device corrects a color of a specific area in a target image into an appropriate color. A representative brightness value represents the specific area in a first color space that has a brightness index value. Representative color component values represent the specific area in a second color space that has no brightness index value and a plurality of color component values. The color of the specific area is corrected based on the representative brightness and color component values. The brightness of the specific area is corrected by modifying the brightness index value in the first color space and the color component values in the second color space. First and second brightness correction degrees are set on the basis of the representative brightness value.

8 Claims, 9 Drawing Sheets

BEFORE DISTRIBUTION ADJUSTMENT OF LUMINANCE CORRECTION DEGREE

AFTER DISTRIBUTION ADJUSTMENT OF LUMINANCE CORRECTION DEGREE

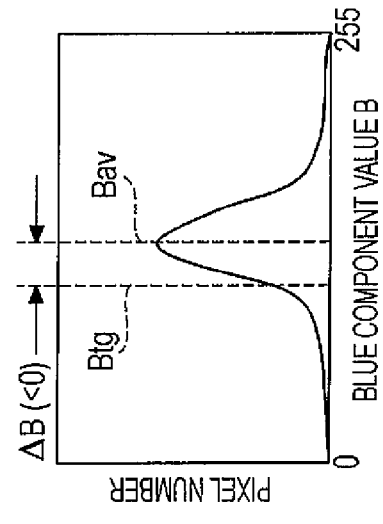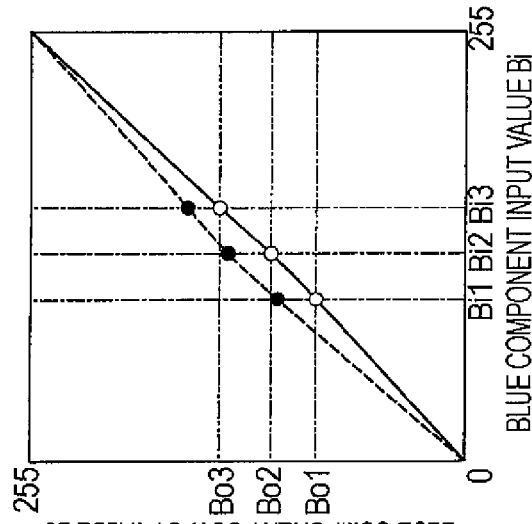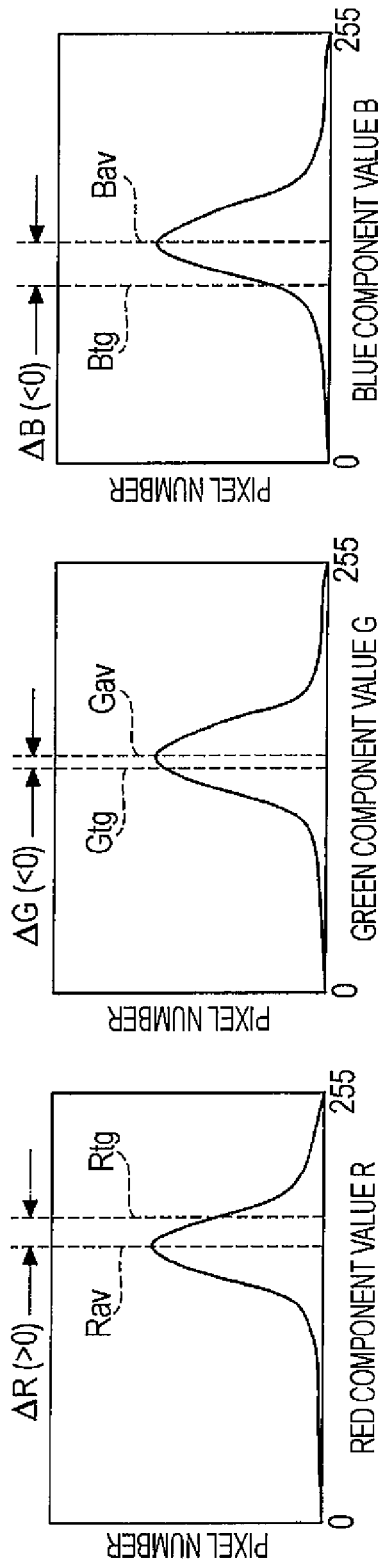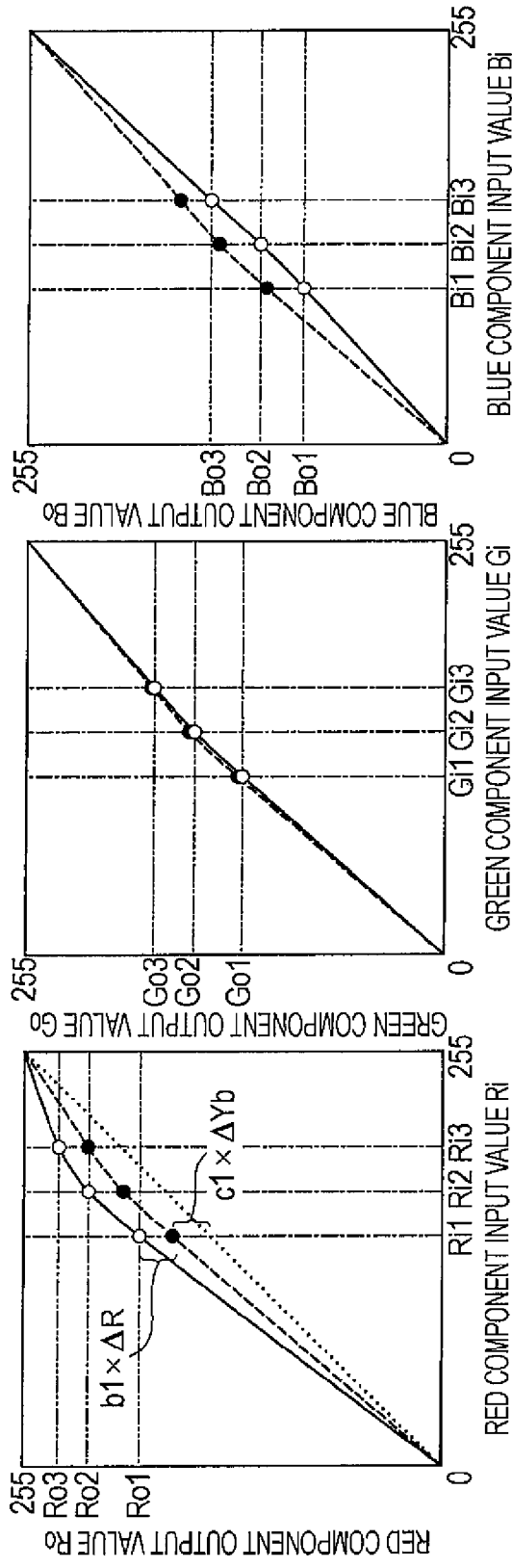

IMAGE PROCESSING DEVICE AND METHOD FOR CORRECTING A COLOR OF A SPECIFIC AREA IN AN IMAGE

CROSS REFERENCE TO RELATED APPLICATIONS

This application claims the benefit of priority under 35 USC 119 of Japanese application no. 2007-225512, filed on Aug. 31, 2007, which application is hereby incorporated by reference.

BACKGROUND

1. Technical Field

The present invention relates to an image processing technique for correcting a color of a specific area in an image into an appropriate color.

2. Related Art

An image printing apparatus such as a printer or a complex machine of a scanner, a printer and a copier (a "multi function peripheral" or "MFP") performs image processing to make a printed image preferable. In some cases, correction of a memory color is performed on a target image to be subjected the image processing. Correction of the memory color is a process of correcting a color of an image area having a particular (memory) color such as a flesh color, a green color, a red color in sunset, and so on into a preferable color.

However, when the brightness of an image is corrected in the memory color correction process, a color balance such as hue may be changed, and thus the color of the area subjected to the memory color correction process may not be preferable. This problem generally occurs in an image printing and processing device such as a personal computer executing image processing software.

SUMMARY

An advantage of some aspects of the invention is that it allows a memory color subjected to a correction process to become a preferable color when brightness of an image is corrected in correction of the memory color.

According to an aspect of the invention, an image processing device corrects a color of a specific area in a target image into an appropriate color. A target image acquiring unit acquires the target image. A representative value acquiring unit acquires a representative brightness value representing the specific area in a first color space that has a brightness index value, and acquires a plurality of representative color component values representing the specific area in a second color space that has no brightness index value and a plurality of color component values. A specific area color correcting unit corrects the color of the specific area on the basis of the representative brightness and color component values acquired by the representative value acquiring unit. The specific area color correcting unit includes: a first brightness correcting section that corrects brightness of the specific area by modifying the brightness index value in the first color space; a second brightness correcting section that corrects brightness of the specific area by modifying the plurality of color component values in the second color space; and a brightness correction degree setting section that sets a first brightness correction degree in the first brightness correcting section and a second brightness correction degree in the second brightness correcting section on the basis of the representative brightness value.

According to the image processing device having this configuration, the brightness of the specific area is corrected by the first brightness correcting unit that modifies the brightness index value in the first color space and the second brightness correcting unit that modifies the color component values in the second color space. Generally, variation in color balance before and after correction of brightness depends on the color space in which the brightness is corrected. Therefore, by correcting the brightness of the specific area using both the first and second brightness correcting units, variation in the color balance of the specific area upon correcting the brightness can be suppressed, thereby correcting the color of the specific area into a preferable color.

In the image processing device having the above-described configuration, the brightness correction degree setting section may repeatedly readjust the first and second brightness correction degrees in accordance with a correction result of a representative color, which is expressed by the representative color component values, in the second brightness correcting section until a variation degree of a color balance of the representative color by the correcting reaches a predetermined allowable range.

According to the image processing device having the above-described configuration, the first and second brightness correction degrees are set by repeatedly readjusting the first and second brightness correction degrees until the variation degree of the color balance of the representative color is within the allowable range. Accordingly, the settings of the first and second brightness correction degrees are more facilitated.

In the image processing device having the above-described configuration, the brightness correction degree setting section may set the first brightness correction degree value to 0 in the first repeat of the readjusting.

Generally, since a color of pixels in the target image is given as a color component value, the correcting process of modifying the color component value can be performed more easily than the correcting process of modifying the brightness index value. Therefore, when the variation degree of the color balance of the representative color upon setting the first brightness correction degree to 0 is within the allowable range, correction by the first brightness correcting unit can be omitted. Accordingly, correction is more facilitated.

In the image processing device having the above-described configuration, the brightness correction degree setting unit may include a post-correction representative color generating section correcting the representative color before the correcting expressed by the representative color component value to generate the representative color after the correcting; and a brightness correction degree adjusting section adjusting the first brightness correction degree and the second brightness correction degree in accordance with variation in the color balance of the representative color before the correcting and variation in the color balance of the representative color after the correcting.

According to the image processing device having the above-described configuration, the first and second brightness correction degrees are set in accordance with the representative color before the correcting and the variation degree of the color balance of the representative color after the correcting by the second brightness correction unit. Therefore, since the first and second brightness correction degrees can be set more appropriately, variation in the color balance of the specific area upon correcting the brightness can be more suppressed.

In the image processing device having the above-described configuration, the specific area color correcting unit may further include: a color balance correction degree acquiring section acquiring a color balance correction degree used to correct a color balance while suppressing variation in brightness of the specific area, on the basis of the representative brightness value and the representative color component value; and a color balance correcting section correcting the color balance of the specific area in the second color space by modifying the plurality of color component values on the basis of the color balance correction degree.

According to the image processing device having the above-described configuration, the color balance correcting unit corrects the color balance of the specific area by modifying the plurality of color component values on the basis of the color balance correction degree used to correct the color balance while suppressing variation in the brightness of the specific area. As described above, variation in color balance by correcting of the brightness is suppressed. Therefore, the brightness can be corrected while the color balance of the specific area is maintained more preferably. Accordingly, the brightness and the color balance of the specific area are more preferable.

The invention can be realized in various forms. For example, the invention can be realized in an image processing device; an image processing method; an image printing apparatus, an image printing method, an image display apparatus, an image display method that uses the image processing device and method; a control apparatus and method of the image processing device, the image printing apparatus, and the image display apparatus; a computer program that realizes functions of the apparatuses and methods; a recording medium that records the computer program; a data signal in which the computer program is in carrier waves; and the like.

BRIEF DESCRIPTION OF THE DRAWINGS

The invention is described with reference to the accompanying drawings, wherein like numbers reference like elements.

FIGS. 10A-10F are explanatory diagrams showing generation of RGB tone curves.

DESCRIPTION OF EXEMPLARY EMBODIMENTS

An embodiment of the invention is now described with reference to examples in the following order:
A. Example, and
B. Modified Examples.

A. EXAMPLE

Figure 1:
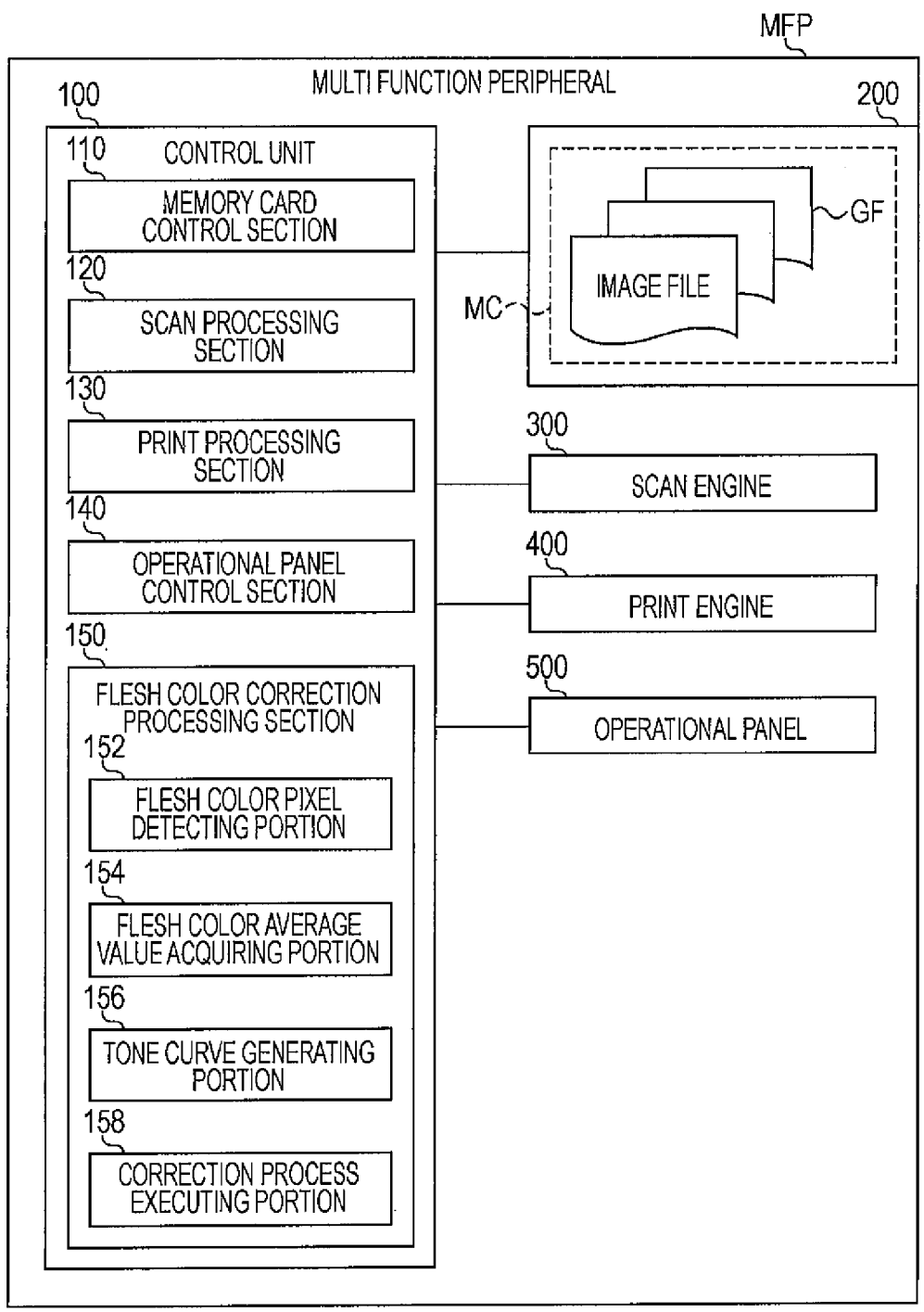
FIG. 1 is a block diagram illustrating a functional configuration of a complex machine MFP according to an embodiment of the invention.

FIG. 1 is a block diagram illustrating a functional configuration of a complex machine MFP of a scanner, a printer and a copier as an exemplary embodiment of the invention. The complex machine MFP includes a control unit 100, a memory card slot 200, a scan engine 300, a print engine 400 and a manipulation panel 500.

The control unit 100 includes a memory card control section 110, a scan processing section 120, a print processing section 130, a manipulation panel control section 140 and a flesh color correction processing section 150. The control unit 100 is configured as a computer that includes a central processing unit (CPU) and a memory. The CPU executes programs stored in the memory to realize functions of the sections included in the control unit 100.

The memory card slot 200 is a mechanism that receives a memory card MC to read and write files stored in the memory card MC. The scan engine 300 is a mechanism that scans an image to generate image data. The print engine 400 is a printing mechanism that performs printing in accordance with printing data. The manipulation panel 500 is a man-machine interface included in the complex machine MFP.

The memory card control section 110, the scan processing section 120, the print processing section 130 and the manipulation panel control section 140 control the memory card slot 200, the scan engine 300, the print engine 400 and the manipulation panel 500, respectively, to realize various functions of the complex machine MFP. Since the invention relates to a color correcting process that does not influence the configuration or functions of these elements, detailed explanation thereof is omitted.

The flesh color correction processing section 150 corrects a flesh color contained in a target image to be printed, and includes a flesh color pixel detecting portion 152, a flesh color average value acquiring portion 154, a tone curve generating portion 156 and a correction process executing portion 158. The flesh color correcting process corrects a flesh color part of a human face or body into a preferable color.

Figure 2:
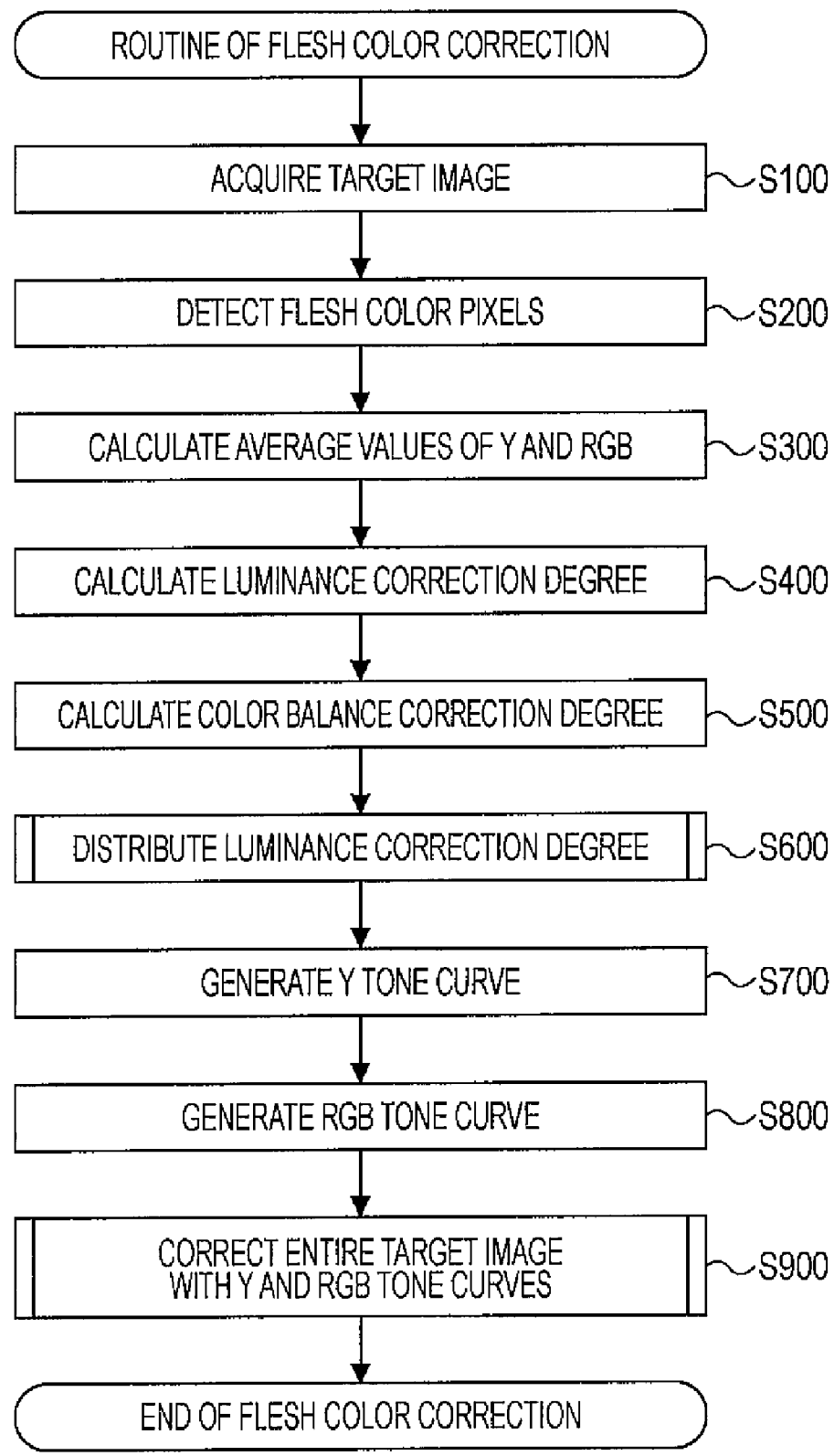
FIG. 2 is a flowchart illustrating a flesh color correction routine executed by a flesh color correction processing section.

FIG. 2 illustrates a flesh color correction routine executed by the flesh color correction processing section 150. The flesh color correction routine is executed, for example, when a user instructs the complex machine MFP using the manipulation panel 500 to print an image to be subjected to the flesh color correcting process. An image that has been subjected to the flesh color correction process is output on a printing medium by the print processing section 130 and a print function realized by the print engine 400.

In Step S100, a target image in which colors of pixels are expressed as colors of an RGB color space is acquired. The target image may be acquired, for example, by reading a graphics file GF stored in the memory card MC (see FIG. 1) and extracting an image from the read graphics file GF. In a case where the image contained in the graphics file GF has been compressed, a development process or the like for restoring the image to a state before compression is performed. In addition, in a case where the colors of pixels in the image contained in the graphics file GF are expressed as colors of a color space (for example, a YCbCr color space)

different from the RGB color space, the extracted image is subjected to a color conversion process. Hereinafter, an image in which the colors of pixels are expressed as the colors of the RGB color space is called "an RGB image" or "an image of an RGB color space". An image in which colors of pixels are expressed as colors of a color space different from the RGB color space is referred to in a like manner.

In Step S200, the flesh color pixel detecting portion 152 detects flesh color pixels in the target image. When flesh color pixels are detected, a human face is first detected. In this case, pixels having hue and saturation corresponding to a flesh color of a nose, a mouth, and the periphery of eyes of the detected human face are detected as flesh color pixels. In detection of a human face, a known face detection method such as pattern matching method using a template (see JP-A-2004-318204) may be used.

In Step S300, the flesh color average value acquiring portion 154 acquires an average value Yav of a luminance value Y (0-255) and average values of color component values R, G, B (0-255) of red (R), green (G) and blue (B) colors for the flesh color pixels detected in Step S200. Hereinafter, the average values Yav, Rav, Gav and Bav are called "flesh color average values."

In Step S400, the tone curve generating portion 156 calculates a luminance correction degree value $\Delta Y$ of the luminance value Y on the basis of the luminance average value Yav acquired in Step S300. Specifically, the luminance correction degree value $\Delta Y$ is calculated using, for example, the following Formula (1) on the basis of the luminance average value Yav and a preferable target value Ytg (for example, 180) as a luminance value of the flesh color $$\Delta Y = Ytg - Yav \quad (1)$$

In Step S500, the tone curve generating portion 156 calculates a color balance correction degree on the basis of the color component averages Rav, Gav and Bav acquired in Step S300. In this case, color balance refers to a balance of the color component values R, G and B. Specifically, the color balance correction degree is calculated as correction degree values $\Delta R$, $\Delta G$ and $\Delta B$ of the RGB color components. Hereinafter, the color balance correction degree values $\Delta R$, $\Delta G$ and $\Delta B$ are also called a color balance correction degree value $\Delta C$. The color balance correction degree values $\Delta R$, $\Delta G$ and $\Delta B$ are calculated using, for example, the following Formulas (2)-(4) on the basis of the color component average values Rav, Gav and Bav and the color component target values Rtg, Gtg and Btg.

$$\Delta R = Rtg - Rav \quad (2),$$

$$\Delta G = Gtg - Gav \quad (3), \text{ and}$$

$$\Delta B = Btg - Bav \quad (4).$$

The color component target values Rtg, Gtg and Btg of the RGB color components are calculated from the luminance average values Yav. Specifically, for a preferable flesh color, color component values of the RGB obtained when a luminance value of the luminance value Y is changed into the luminance average value Yav are set to the color component target values Rtg, Gtg and Btg. In addition, the color component target values Rtg, Gtg and Btg can be calculated using the following Formulas (5)-(7) on the basis of, for example, the luminance average value Yav.

$$Rtg = kr \times Yav \quad (5),$$

$$Gtg = kg \times Yav \quad (6), \text{ and}$$

$$Btg = kb \times Yav \quad (7).$$

In this case, kr, kg and kb are proportionality coefficients set in every color component of RGB colors in advance. Formulas (5)-(7) show that the color component target values Rtg, Gtg and Btg are evaluated by multiplying the proportionality coefficients by the luminance average value Yav. The proportionality coefficients kr, kg and kb are set so that the luminance value calculated from the color component target values Rtg, Gtg and Btg is substantially equal to the luminance average value Yav. Therefore, even though the color balance is corrected, variation of the luminance average value is suppressed, and thus the luminance average value before correction is substantially equal to that after correction. Moreover, the proportionality coefficients kr, kg and kb may not be constant, but may be given as a function using the luminance average value Yav as a parameter.

In Step S600, the tone curve generating portion 156 distributes the luminance correction degree value $\Delta Y$ (hereinafter, also called "the entire luminance correction degree value $\Delta Y$") into a correction degree value $\Delta Ya$ of the luminance value Y by a luminance tone curve (Y tone curve) and a correction degree value $\Delta Yb$ of the luminance value Y by a tone curve (RGB tone curves) of each of the color component values RGB. Hereinafter, the correction degree value $\Delta Ya$ of the luminance value Y by the Y tone curve is also called "a Y luminance correction degree" and the correction degree value $\Delta Yb$ of the luminance values Y by the RGB tone curves are also called "RGB luminance correction degree."

Figure 3:
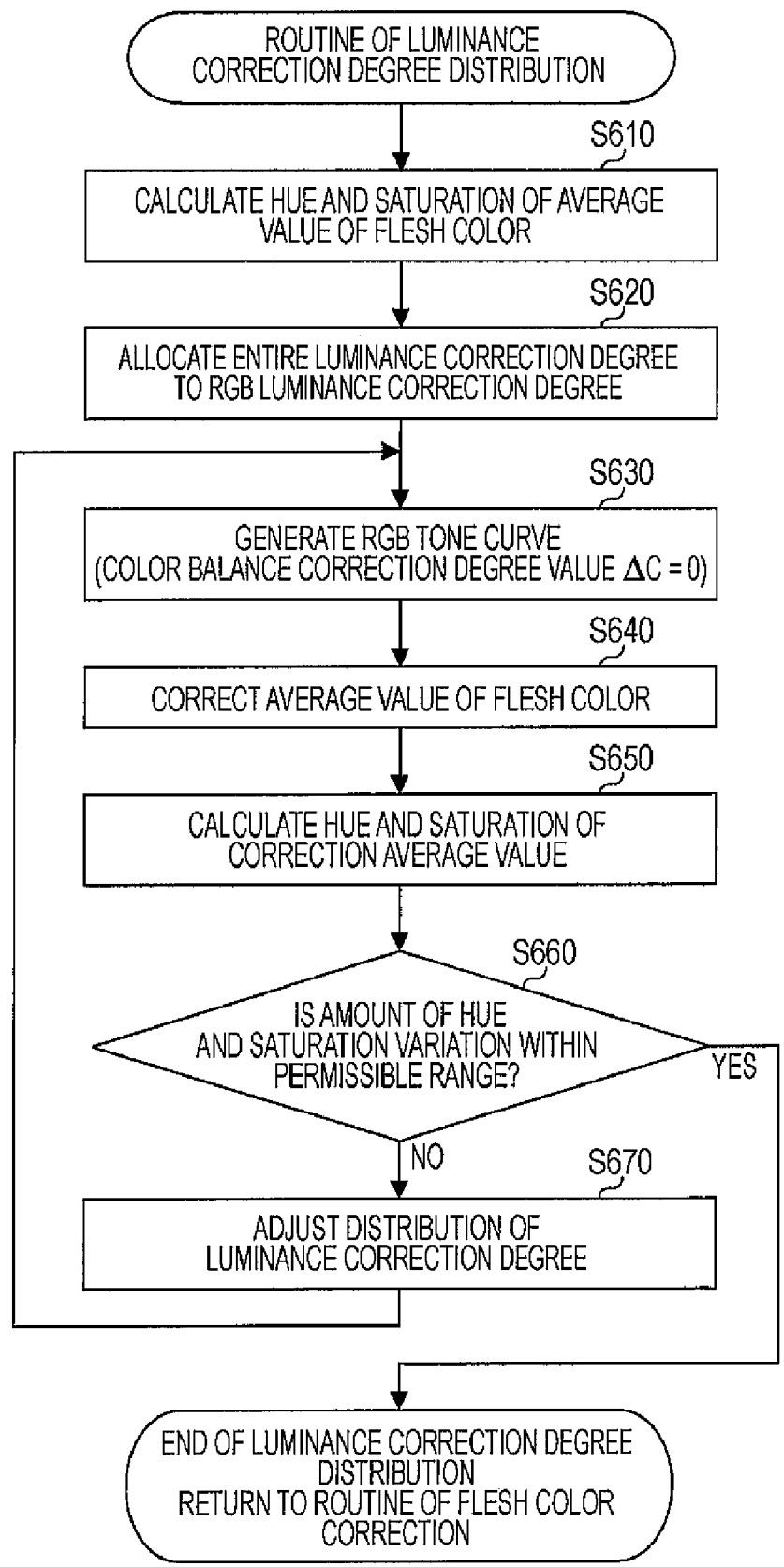
FIG. 3 is a flowchart illustrating a luminance correction degree distribution routine executed in Step S600.
Figure 4:
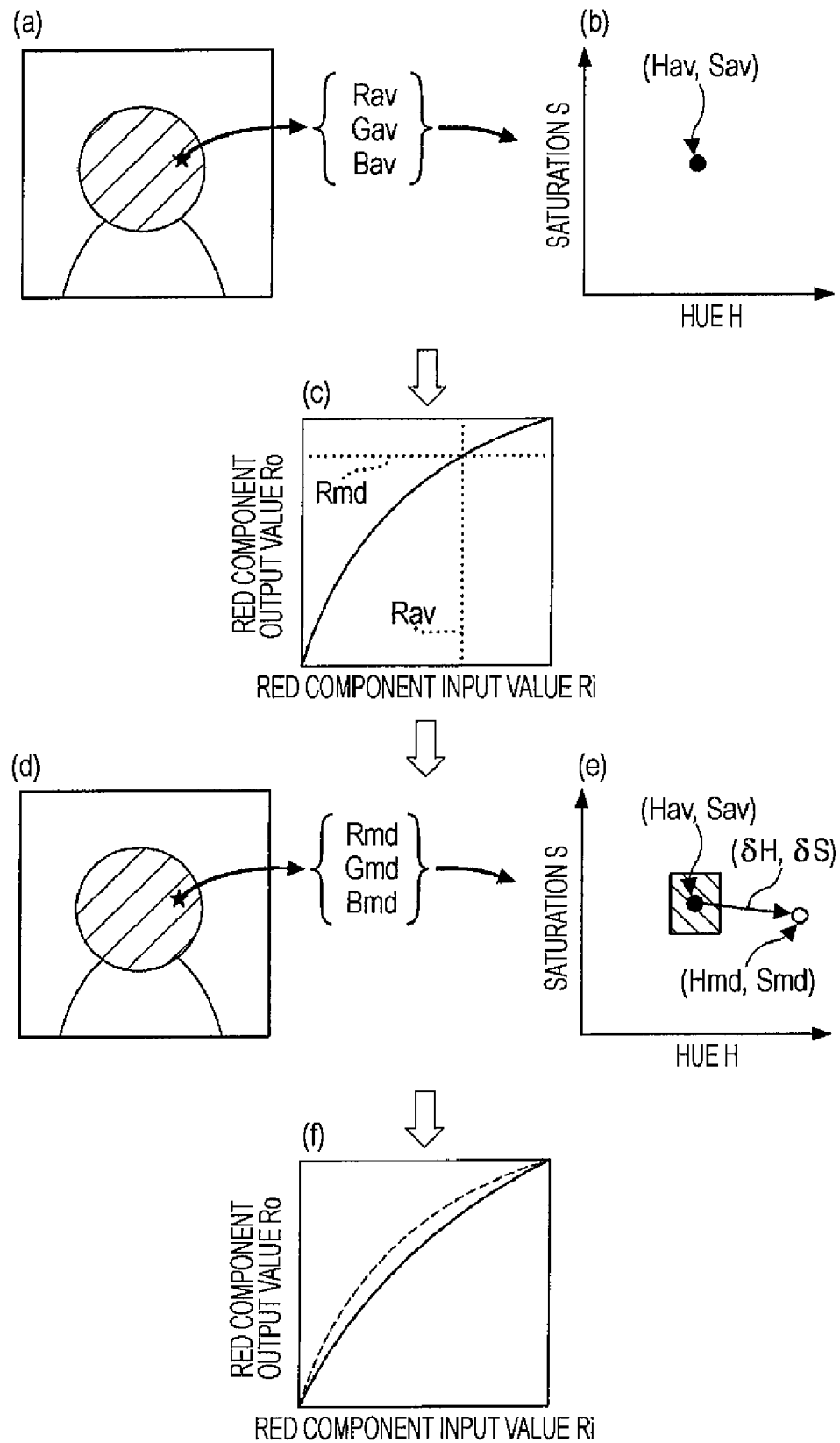
FIG. 4 is an explanatory diagram showing that an entire luminance correction degree value ΔY is distributed in accordance with the luminance correction degree distribution routine of FIG. 3.

FIG. 3 illustrates a luminance correction degree distribution routine executed in Step S600. FIG. 4 is an explanatory diagram showing that the entire luminance correction degree value $\Delta Y$ is distributed in accordance with the luminance correction degree distribution routine in FIG. 3.

In Step S610, the tone curve generating portion 156 calculates an average value Hav of hue H (0-360°) of the flesh color pixels and an average value Sav of saturation S (0-100%) from the color component average values Rav, Gav and Bav. The calculating of the hue average value Hav and the saturation average value Sav from the color component average values Rav, Gav and Bav can be performed using a known color conversion method of converting colors from the RGB color space to an HSB color space. Hereinafter, the hue average value Hav and the saturation average value Sav are also called the hue and saturation of the flesh color average value. In an example of FIG. 4, the hue average value Hav and the saturation average value Sav shown in (b) are calculated from the flesh color average values (the color component average values Rav, Gav and Bav) of a human face area indicated by hatching in (a) of FIG. 4.

In Step S620, the tone curve generating portion 156 allocates the entire luminance correction degree value $\Delta Y$ to the RGB luminance correction degree value $\Delta Yb$. That is, the Y luminance correction degree value $\Delta Ya$ is set to 0 and the RGB luminance correction degree value $\Delta Yb$ is set to the entire luminance correction degree value $\Delta Y$.

Figure 5:
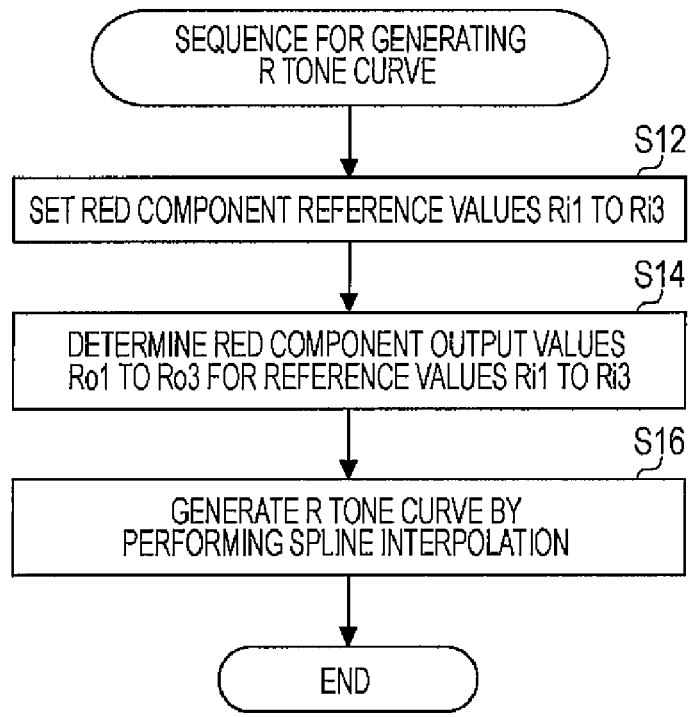
FIG. 5 is a flowchart illustrating a sequence of generating an R tone curve.
Figure 6:
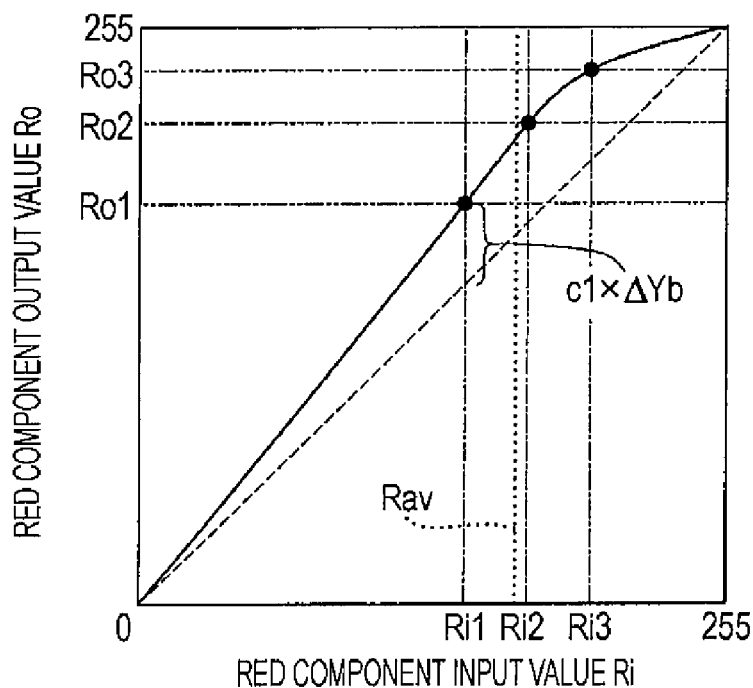
FIG. 6 is an explanatory diagram showing generation of the R tone curve.

In Step S630, the tone curve generation portion 156 generates the RGB tone curves by setting the color balance correction degree value $\Delta C$ to 0. FIG. 5 is a flowchart illustrating a sequence of generating the R tone curve. FIG. 6 is an explanatory diagram showing generation of the R tone curve. Since the G tone curve and the B tone curve are generated in the same manner as that of the R tone curve, repeat explanation is omitted.

In Step S12 of FIG. 5, as shown in FIG. 6, the tone curve generating portion 156 sets three reference values (red component reference values) Ri1-Ri3 of red component input values Ri arranged at the same interval. However, the number of the red component reference values may not be three, but may be set to the arbitrary number of one or more. In addition, the interval of the red component reference values Ri1-Ri3 may not be the same interval.

The location of the three red component reference values Ri1-Ri3 is set on the basis of the red component average value Rav and the luminance average value Yav. When the red component reference values Ri1-Ri3 are set on the basis of the red component average value Rav, the red component reference values Ri1-Ri3 can be set in the following manner, for example:

1. acquire division points (red component values) obtained by equally dividing the entire range (0-255) of the red component value R by a predetermined number (for example, 17);

2. set the division point which is the closest to the red component average value Rav to the middle red component reference value Ri2;

3. set the division point of which the red component value is lower than that of the red component reference value Ri2 by one level to the red component reference Ri1; and 4. set the division point of which the red component value is higher than that of the red component reference value Ri2 by one level to the red component reference value Ri3.

In Step S14, the tone curve generating portion 156 determines red component output values Ro1-Ro3 for the red component reference values Ri1-Ri3. The red component output values Ro1-Ro3 are calculated using the following Formulas (8)-(10).

$$Ro1 = fr1(Ri1, \Delta R, \Delta Yb) \quad (8),$$

$$Ro2 = fr2(Ri2, \Delta R, \Delta Yb) \quad (9), \text{ and}$$

$$Ro3 = fr3(Ri3, \Delta R, \Delta Yb) \quad (10).$$

Formula (8) expresses that the red component output value Ro1 for the red component reference value Ri1 is evaluated by a red component correction function fr1 using the red component reference value Ri1, the red component correction degree value $\Delta R$ and the RGB luminance correction degree value $\Delta Yb$ as parameters. Formulas (9) and (10) express that the red component output value Ro2 for the red component reference value Ri2 and the red component output value Ro3 for the red component reference value Ri3 are evaluated by red component correction functions fr2 and fr3, respectively, as with the red component correction function fr1.

The red component correction functions fr1-fr3 restore the red component reference values Ri1-Ri3, respectively, when the red component correction degree value $\Delta R$ and the RGB luminance correction degree value $\Delta Yb$ are 0. The red component correction functions fr1-fr3 have a monotonically increasing property with respect to the red component correction degree value $\Delta R$ and the RGB luminance correction degree value $\Delta Yb$. The red component correction functions fr1-fr3 can be expressed using the following Formulas (11)-(13), for example.

$$fr1(Ri1, \Delta R, \Delta Yb) = Ri1 + b1 \times \Delta R + c1 \times \Delta Yb \quad (11),$$

$$fr2(Ri2, \Delta R, \Delta Yb) = Ri2 + b2 \times \Delta R + c2 \times \Delta Yb \quad (12), \text{ and}$$

$$fr3(Ri3, \Delta R, \Delta Yb) = Ri3 + b3 \times \Delta R + c3 \times \Delta Yb \quad (13).$$

Formula (11) expresses that the red component correction function fr1 is given by a sum of a product value of the red component correction degree value $\Delta R$ and a proportionality coefficient b1, a product value of the RGB luminance correction degree value $\Delta Yb$ and a proportionality coefficient c1,
and the red component reference value Ri1. As expressed in Formulas (12) and (13), the red component correction functions fr2 and fr3 are given in the same manner as the red component correction function fr1. The proportionality coefficients b1-b3 can be determined on the basis of a variation degree or the like of the red component average value in a case of performing the correcting using the generated R tone curve. Moreover, the proportionality coefficients c1-c3 can be determined on the basis of a variation degree or the like of the red component average value in a case of performing the correcting using the generated R tone curve.

In the example of FIG. 6, the red component correction degree value $\Delta R$ is set to 0. Therefore, when Formula (11) is used as the red component correction function fr1, the red component output Ro1 for the red component reference value Ri1 is calculated with reference to the following Formula (14), as shown in FIG. 6.

$$Ro1 = Ri1 + c1 \times \Delta Yb \quad (14)$$

In Step S16 of FIG. 5, the tone curve generating portion 156 generates a tone curve by performing spline interpolation. Specifically, a spline curve passing through three points (Ri1, Ro1), (Ri2, Ro2), and (Ri3, Ro3) indicated by black circles shown in FIG. 6 and two end points (0, 0) and (255, 255) is generated. In this way, the R tone curve is generated. In the example of FIG. 6, the RGB luminance correction degree value $\Delta Yb$ ($=\Delta Y$) has a positive value. Accordingly, the generated R tone curve is a tone curve in which the red component output value Ro in the red component average value Rav is higher than the red component input value Ri ($=$Rav) so as to increase the luminance value.

In this embodiment, the R tone curve is generated as a look-up table (LUT) where the red component output values Ro are given with respect to the division points (red component values) obtained by dividing the entire range (0-255) of the red component input values Ri by a predetermined number (for example, 17) and the two end points (0, 0) and (255, 255) of the red component input values Ri (hereinafter, also called division points, and the end points are also called "grid points"). In this case, as for the red component input value Ri different from the grid points, the red component output value Ro for the red component input value Ri is calculated by interpolating the red component output values of two grid points that are the closest to the red component input value Ri. However, the R tone curve may be not necessarily generated as the LUT.

(c) of FIG. 4 is generated in this way and shows the R tone curve applied to the red component value R. Since a G tone curve applied to a green component value and a B tone curve applied to a blue component value are generated in the same manner as the R tone curve, repeat illustration is omitted.

In Step S640 of FIG. 3, the tone curve generating portion 156 generates a flesh color correction value subjected to the correcting of the flesh dolor average value by applying the tone curve generated in Step S630 to the flesh color average value. Specifically, as shown in (c) of FIG. 4, a red component correction value Rmd is generated by correcting the red component average value Rav using the R tone curve generated in Step S630. Likewise, the green component average value Gav is corrected using the G tone curve to generate a green component correction value Gmd. In addition, the blue component average value Bav is corrected using the B tone curve to generate the blue component correction value Bmd.

In Step S650, the tone curve generating portion 156 calculates hue Hmd (hue correction value) and saturation Smd (saturation correction value) of the flesh color correction values Rmd, Gmd and Bmd, in the same manner as calculated in Step S610. In the example of FIG. 4, the hue correction value Hmd and the saturation correction value Smd are calculated from the flesh color correction values (the flesh color correction values Rmd, Gmd and Bmd) of a facial area indicated by hatching in (d) of FIG. 4. The hue correction value Hmd and the saturation correction value Smd (indicated by a white circle in (e) of FIG. 4) calculated in this way are set as different values from the hue average value Hav and the saturation average value Sav (indicated by a black circle) that are not subjected to the correcting.

In Step S660, the tone curve generating portion 156 determines whether hue and saturation variation degrees caused by the correcting of the flesh color average values in Step S640 are within an allowable range. When the hue and saturation variation degrees are all within the allowable range, the luminance correction degree distribution routine ends, and the routine returns to the flesh color correction routine shown in FIG. 2. Alternatively, when at least one of the hue and saturation variation degrees is out of the allowable range, the routine moves to Step S670. Specifically, the tone curve generating portion 156 calculates a hue variation degree value δH determined by the hue correction value Hmd and the hue average value Hav and a saturation variation degree value δS determined by the saturation correction value Smd and the saturation average value Sav. When the hue variation degree value δH is smaller than a predetermined permissible value (for example, 2°) and the saturation variation degree value δS is smaller than a predetermined allowable range (for example, 5%), it is determined that the hue and saturation variation degrees are within the allowable range. The hue variation degree value δH and the saturation variation degree value δS are calculated with reference to the following Formulas (15) and (16), for example.

$$\delta H = |Hmd - Hav| \quad (15), \text{ and}$$

$$\delta S = |Smd - Sav| \quad (16).$$

Formula (15) expresses that the hue variation degree value δH is calculated as an absolute value of a difference between the hue correction value Hmd and the hue average value Hav. Likewise, Formula (16) expresses that the saturation variation degree value δS is calculated as an absolute value of a difference between the saturation correction value Smd and the saturation average value Sav.

In the example of FIG. 4, the hue correction value Hmd and the saturation correction value Smd indicated by a white circle in (e) of FIG. 4 are out of the allowable range indicated by hatching. Therefore, in Step S660 of FIG. 3, it is determined that the hue and saturation variation degrees are out of the allowable range, and the routine returns to Step S670.

In Step S670, the tone curve generating portion 156 adjusts distribution of the bright correction degree value ΔY. Specifically, when the entire luminance correction degree value ΔY is a positive value, the RGB luminance correction degree value ΔYb is decreased by a predetermined degree value α and the Y luminance correction degree value ΔYa is increased by the predetermined degree value α. Alternatively, when the entire luminance correction degree value ΔY is a negative value, the RGB luminance correction degree value ΔYb is increased by the predetermined degree value α and the Y luminance correction degree value ΔYa is decreased by the predetermined degree value α. Since the variation degree value α of the RGB luminance correction degree value ΔYb and the Y luminance correction degree value ΔYa are set to be equal, the entire luminance correction degree value ΔY (=ΔYa+ΔYb) is maintained uniformly. In this embodiment, the variation degree value α is set to a predetermined value. However, the variation α may be set to a function using at least one of the hue variation degree value δH and the saturation variation degree value δS as a parameter.

In this embodiment, the distribution of the luminance correction degree value ΔY is adjusted depending on whether the hue variation degree value δH and the saturation variation degree value δS are within the allowable range. Generally, the distribution of the luminance correction degree value ΔY may be adjusted depending on a variation degree of the color balance which is subjected to the correcting or not. As the variation degree of the color balance, only the hue variation degree value δH may be used and a variation degree of a ratio of the RGB color components, as well as the hue variation degree value δH and the saturation variation degree value δS.

After the distribution of the luminance correction degree value ΔY in Step S670 is adjusted, the routine returns to Step S630. As shown by a solid line in (f) of FIG. 4, an R tone curve different from the R tone curve (indicated by a dashed line) that is not subjected to the adjusting of the distribution is generated. G and B tone curves are generated in the same manner. Steps S630-S670 are repeated until the hue and saturation variation degrees are within the allowable range.

Figure 7:
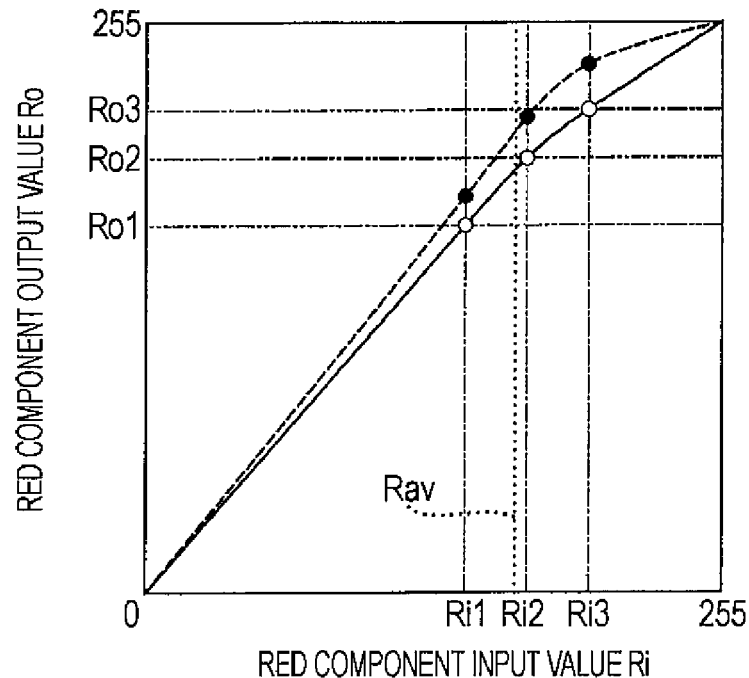
FIG. 7 is an explanatory diagram showing the generation of the R tone curve after distribution of the degree value ΔY of luminance correction is adjusted.

FIG. 7 shows the generation of the R tone curve in Step S630 after the RGB luminance correction degree value ΔYb is decreased and the Y luminance correction degree value ΔYa is increased in Step S670.

As described above, the red component correction functions fr1-fr3 which give the red component output values Ro1-Ro3 for the red component reference values Ri1-Ri3, respectively, have a monotonic increasing property with respect to the RGB luminance correction degree value ΔYb. Therefore, as shown in FIG. 7, the red component output values Ro1-Ro3 (indicated by white circles in FIG. 7) subjected to the adjusting of the distribution in which the RGB luminance correction degree value ΔYb is decreased are lower than the red component output values Ro1-Ro3 (indicated by black circles in FIG. 7) which are not subjected to the adjusting of the distribution. Each of the red component output value Ro becomes lower at the red component average value Rav in the R tone curve (indicated by a sold line) that is subjected to the adjusting of the distribution than in the R tone curve (indicated by a dashed line) that is not subjected to the adjusting of the distribution. That is, the correction degree of the luminance value Y is smaller in the R tone curve that is subjected to the adjusting of the distribution than in the R tone curve that is not subjected to the adjusting of the distribution.

Figure 8:
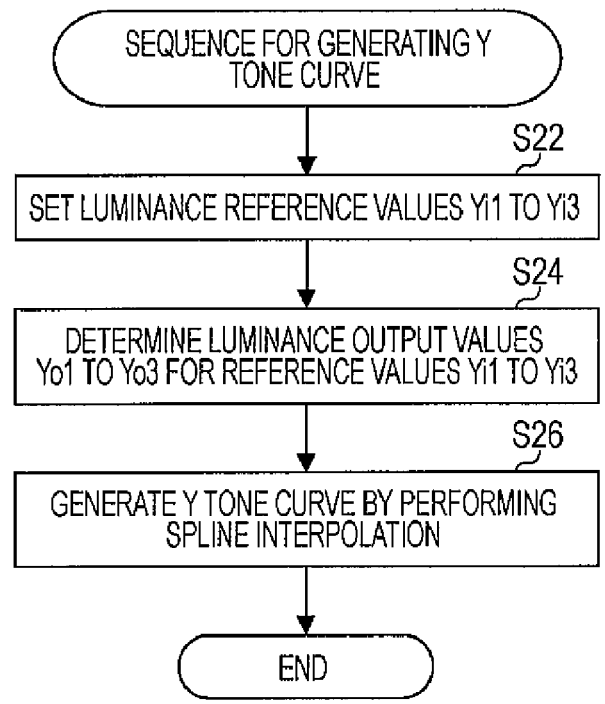
FIG. 8 is a flowchart illustrating a sequence of generating a Y tone curve.
Figure 9:
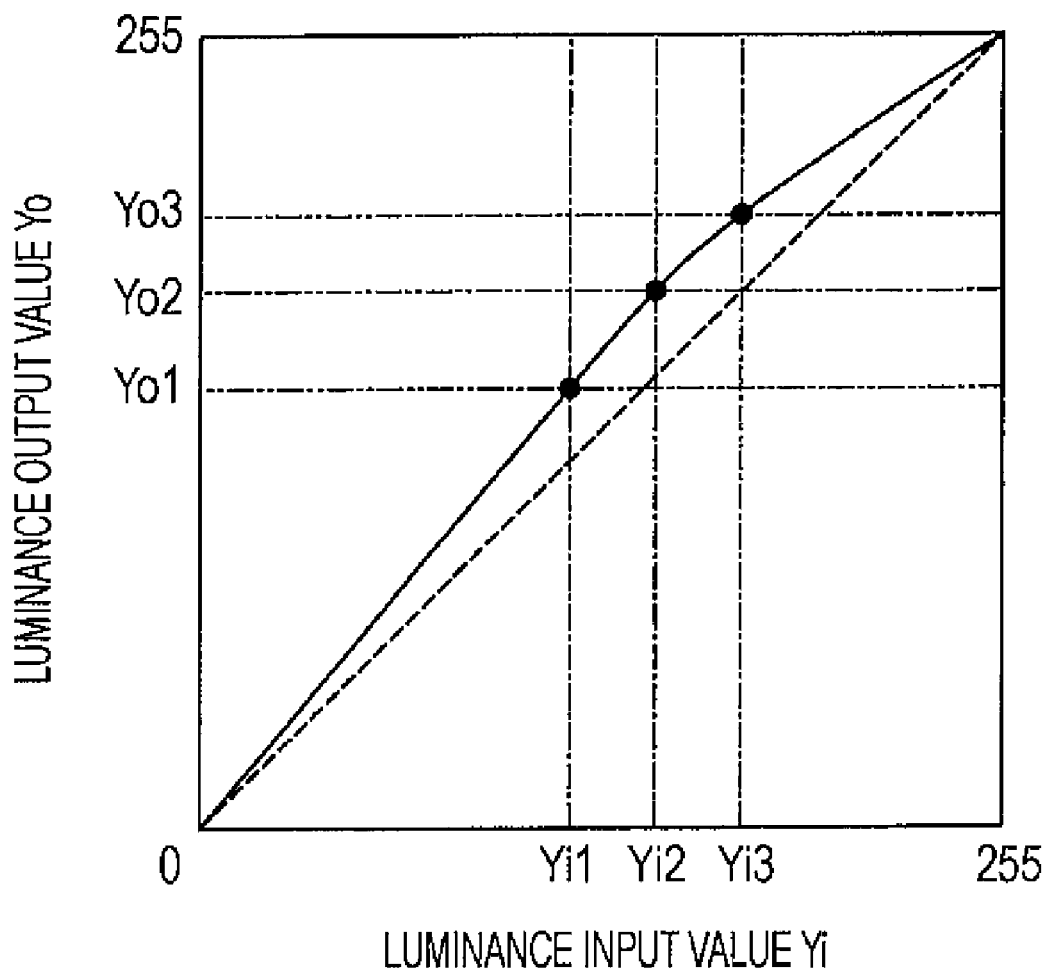
FIG. 9 is an explanatory diagram showing generation of the Y tone curve.

When the routine returns from the luminance correction degree distribution routine in FIG. 3 to the flesh color correction routine in FIG. 2, the tone curve generating portion 156 generates the Y tone curve in Step S700. FIG. 8 is a flowchart illustrating a sequence of generating the Y tone curve. FIG. 9 is an explanatory diagram showing the generation of the Y tone curve.

In Step S22 of FIG. 8, the tone curve generating portion 156 sets three reference values (luminance reference values) Yi1-Yi3 of luminance input values Yi arranged at the same interval, as shown in FIG. 9. The three luminance reference values Yi1-Yi3 are set on the basis of the luminance average value Yav, like the red component reference values Ri1-Ri3 in Step S12 of FIG. 5. The number of luminance reference values may be set to any number of one or more, and the interval of the luminance reference values Yi1-Yi3 may not be the same, as with the red component reference values Ri1-Ri3.

Next, in Step S24, the tone curve generating portion 156 determines luminance output values Yo1-Yo3 for the luminance reference values Yi1-Yi3, respectively. The luminance output values Yo1-Yo3 are calculated with reference to the following Formulas (17)-(19).

$$Yo1 = fy1(Yi1, \Delta Ya) \quad (17),$$

$$Yo2 = fy2(Yi2, \Delta Ya) \quad (18), \text{ and}$$

$$Yo3 = fy3(Yi3, \Delta Ya) \quad (19).$$

Formula (17) expresses that the luminance output value Yo1 for the luminance reference value Yi1 is given by the luminance correction function fy1 using the luminance reference value Yi1 and the Y luminance correction degree value ΔYa as parameters. Formulas (18) and (19) express that the luminance output value Yo2 for the luminance reference value Yi2 and the luminance output value Yo3 for the luminance reference value Yi3 are given by the luminance correction functions fy2 and fy3, which are the same as the luminance correction function fy1, respectively.

The luminance correction functions fy1-fy3 are functions that restore the luminance reference values Yi1-Yi3 when the Y luminance correction degree value ΔYa is 0, and have a monotonic increasing property with respect to the Y luminance correction degree value ΔYa. The luminance correction functions fy1-fy3 can be expressed using the following Formulas (20)-(22).

$$fy1(yi1, \Delta Ya) = Yi1 + a1 \times \Delta Ya \quad (20),$$

$$fy2(yi2, \Delta Ya) = Yi2 + a2 \times \Delta Ya \quad (21), \text{ and}$$

$$fy3(yi3, \Delta Ya) = Yi3 + a3 \times \Delta Ya \quad (22).$$

The Formula (20) expresses that the luminance correction function fy1 is given by adding a product of the Y luminance correction degree value ΔYa and the proportionality coefficient a1 to the luminance reference value Yi1. As expressed by Formulas (21) and (22), the luminance correction functions fy2 and fy3 are given likewise the luminance correction function fy1. The proportionality coefficients a1 to a3 can be determined on the basis of a variation degree or the like of the luminance average value when the correcting is performed using the generated Y tone curve.

In Step S26 of FIG. 8, the tone curve generating portion 156 generates a tone curve by performing spline interpolation, as in Step S16 of FIG. 5. Specifically, as shown in FIG. 9, a spline curve passing through three points (Yi1, Yo1), (Yi2, Yo2), and (yi3, Yo3) indicated by the black circle in the figure and two end points (0, 0) and (255, 255) is generated. In this way, the Y tone curve is generated. In addition, in this embodiment, the Y tone curve may also be generated as the LUT, but the Y tone curve may not be necessarily generated as the LUT.

In Step S800 of FIG. 2, the tone curve generating portion 156 generates the RGB tone curves. FIG. 10 is an explanatory diagram showing the generation of the RGB tone curves. The generation of the RGB tone curves in Step S800 is the same as that in Step S630, except that the color correction value ΔC acquired in Step S500 is reflected. Accordingly, a repeat explanation is omitted.

FIGS. 10A-10C are histograms showing a relationship between each of the RGB color component values R, G and B and its frequency (the number of flesh color pixels). The RGB tone curves generated in Step S800 are indicated by solid lines of FIGS. 10D-10F. Dashed lines of FIGS. 10D-10F indicate the RGB tone curves when the color balance correction degree value ΔC generated in Step S630 is set to 0.

In this example, as shown in FIG. 10A, the red component average value Rav is lower than the red component target value Rtg. Accordingly, the red component correction degree value ΔR calculated in Step S500 of FIG. 2 is a positive value.

As described above, the red component correction functions fr1-fr3 that give the red component output values Ro1-Ro3 for the red component reference values Ri1-Ri3 have a monotonic increasing property with respect to the red component correction degree value ΔR. Therefore, as shown in FIG. 10D, the red component output values Ro1-Ro3 (indicated by white circles in FIG. 10D) reflecting the red component correction degree value ΔR become higher than the red component output values Ro1-Ro3 (indicated by the black circles in FIG. 10D) upon setting the red component correction degree value ΔR to 0. Accordingly, the red component value R is higher in the R tone curve generated in Step S800 indicated by the solid line than in the R tone curve generated in Step S630 (FIG. 3) indicated by the dashed line.

In this example, as shown in FIG. 10D, when Formula (11) is used as the red component correction function fr1, the red component value becomes higher in the red component output value Ro1 than in the red component input value (red component reference value) Ri1 by an offset (c1×ΔYb) corresponding to the RGB luminance correction degree value ΔYb and an offset (b1×ΔR) corresponding to the red component correction degree value ΔR.

Meanwhile, as shown in FIGS. 10B and 10C, the green component average value Gav and the blue component average value Bav are higher than the green component target value Gtg and the blue component target value Btg, respectively. Therefore, the green component correction degree value ΔG and the blue component correction degree value ΔB calculated in Steps S500 of FIG. 2 are negative values. Accordingly, the green component value G is lower in the G tone curve (indicated by a solid line in FIG. 10E) generated in Step S800 than in the G tone curve (indicated by a dashed line in FIG. 10E) generated upon setting the color balance correction degree value ΔC to 0. Likewise, the blue component value B is lower in the B tone curve (indicated by a solid line in FIG. 10F) generated in Step S800 than in the B tone curve (indicated by a dashed line in FIG. 10F) generated upon setting the color balance correction degree value ΔC to 0.

Figure 11:
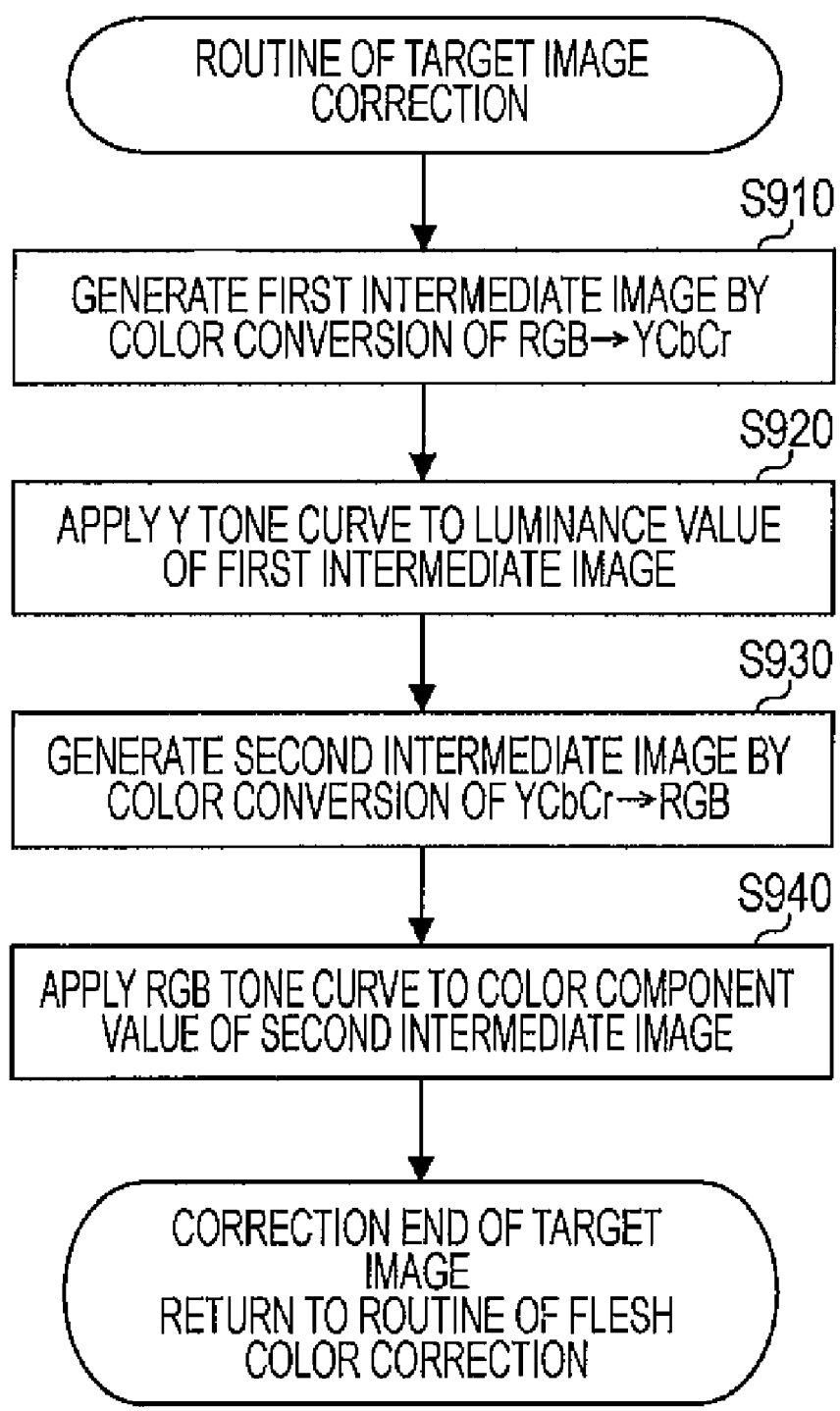
FIG. 11 is a flowchart illustrating an image correction sequence executed in Step S900 of FIG. 2.

In Step S900 of FIG. 2, the correction process executing portion 158 corrects the Y tone curve generated in Step S700 and the target image using the RGB tone curves generated in Step S800. FIG. 11 illustrates an image correction routine executed in Step S900 of FIG. 2.

In Step S910, the correction process executing portion 158 generates a first intermediate image from the target image. Specifically, a color conversion process of converting the target image of the RGB color space from the RGB color space to the YCbCr color space is performed to generate the first intermediate image of the YCbCr color space.

In Step S920, the correction process executing portion 158 corrects the luminance Y by applying the Y tone curve (FIG. 9) to each pixel luminance value Y of the first intermediate image. The luminance values of the first intermediate image are corrected by applying the Y tone curve to the first intermediate image, so that the luminance average value of the flesh color varies by the Y luminance correction degree value ΔYa. Normally, when the luminance value Y is corrected in the YCbCr color space, variation in the saturation before and after the correcting is larger than that in a case where the RGB color component values R, G and B are changed to correct the luminance value. Meanwhile, in this embodiment, an absolute value |ΔYa| of the Y luminance correction degree value ΔYa is set to be equal to or less than an absolute value |ΔY| of the entire luminance correction degree value ΔY. In this way, it is possible to suppress the variation in the saturation.

In Step S930, the correction process executing portion 158 generates a second intermediate image from the image (an image to which the Y tone curve is applied) subjected to the correcting of the luminance value Y in Step S920. Specifically, a color conversion process of converting the image subjected to the Y tone curve of YCbCr color space from the YCbCr color space to the RGB color space is performed to generate the second intermediate image of the RGB color space.

In Step S940, the correction process executing portion 158 corrects the color component values R, G and B by applying the RGB tone curves (indicated by the solid lines of FIGS. 10D-10F) generated in Step S800 (FIG. 2) to the second intermediate image. The color component values R, G and B of the second intermediate image are corrected by applying the RGB tone curves to the second intermediate image, so that the luminance average value of the flesh color pixels further vary by the RGB luminance correction degree value $\Delta Yb$ and the color balance is corrected. Even though the luminance value Y in the YCbCr color space is modified, the hue rarely varies. However, when the RGB color component values R, G and B are modified and the luminance value is corrected, there is a possibility that the hue varies after and before the correcting. Meanwhile, in this embodiment, since the absolute value $|\Delta Yb|$ of the RGB luminance correction degree value $\Delta Yb$ is set to be equal to or less than the absolute value $|\Delta Y|$ of the entire luminance correction degree value $\Delta Y$, the variation in the hue can be suppressed.

In this way, according to this embodiment, the brightness of the target image is corrected so that the luminance average value of the flesh color pixels becomes a preferable luminance value while variation in hue and saturation after and before the correcting is suppressed, by applying the Y and RGB tone curves to the target image and correcting the luminance value. Moreover, the color balance of the flesh color pixels can be more preferable by reflecting the color balance correction degree value $\Delta C$ to the RGB tone curves.

B. MODIFIED EXAMPLES

The invention is not limited to the above-described embodiment and may be modified into various forms without departing from the scope of the invention. For example, the modified examples described below are possible.

B1. Modified Example 1

In the above-described embodiment, the flesh color correcting process is performed on the entire target image using the Y and RGB tone curves. However, it is not necessary to perform the correcting process on the entire target image as long as the color correcting process on a flesh color area is possible. For example, the correcting process on the flesh color pixels detected in Step S200 may be performed using the Y and RGB tone curves. However, it is preferable to perform the flesh color correcting process on the entire target image in that variation in the flesh color is more natural in the flesh color pixels and the boundary of the flesh color.

B2. Modified Example 2

In the above-described embodiments, the correcting process of the second intermediate image by which the color component values R, G and B in the RGB color space is performed using the RGB tone curve generated on the basis of the RGB luminance correction degree value $\Delta Yb$ and the color balance correction degree value $\Delta C$. However, it is not necessary to necessarily perform the correcting process on the second intermediate image using one type of the RGB tone curve. For example, correcting can be performed by separately applying the RGB tone curve generated on the basis of the RGB luminance correction degree value $\Delta Yb$ and the RGB tone curve generated on the basis of the color balance correction degree value $\Delta C$ to the second intermediate image.

B3. Modified Example 3

In the above-described embodiments, the correcting process (Steps S910-930 of FIG. 11) of modifying the luminance value Y in the YCbCr color space is performed before the correcting process (Step S940) of modifying the color component values R, G and B in the RGB color space. However a correction sequence thereof is not limited thereto. Specifically, the correcting process of modifying the color component values R, G and B in the RGB color space may be performed before the correcting process of modifying the luminance value Y in the YCbCr color space. When the Y luminance correction degree value $\Delta Ya$ is set to 0, the correcting process (Steps S910-S930 of FIG. 11) of modifying the luminance value Y may be omitted. In this case, since the conversion (Steps S910 and S930) can be omitted in addition to the modification (Step S920) of the luminance value, the number of necessary processes of correcting the flesh color can be reduced.

B4. Modified Example 4

In the above-described embodiments, the tone curves in which the two end points (0, 0) and (255, 255) are fixed are used as the Y and RGB tone curves used to correct the flesh color. However, the tone curve used to correct the flesh color is not limited thereto. As the Y and RGB tone curves used to correct the flesh color, a tone curve may be used in which the output values Yo, Ro, Go, and Bo for at least one of the end points (0, 0) and (255, 255) of the input values Yi, Ri, Gi, and Bi are different from the input values.

B5. Modified Example 5

In the above-described embodiments, the flesh color average values Yav, Rav, Gav and Bav of the luminance value Y and the color component values R, G and B for the flesh color pixels are calculated and the luminance correction degree value $\Delta Y$ and the color balance correction degree value $\Delta C$ are calculated on the flesh color averages values. However, the luminance value (luminance representative value) or the color component value (representative color component value) representing a color of a specific area corresponding to the flesh color pixels may be generally used. As these representative values (flesh color representative values), a luminance value or the color component value of a specific location (for example, a forehead) of a human face detected in Step S200 may be used, for example.

B6. Modified Example 6

In the above-described embodiments, the brightness value Y of the YCbCr color space is used as a brightness index value of the flesh color pixels. However, the brightness index value may be used in any color space as long as the brightness index value is used as the brightness index value of the flesh color pixels. As the brightness index value, luminance L* in the L*a*b color space or brightness B in an HSB color space may be used as the brightness index value, for example. In this case, the correction degree of brightness is given as a correction degree of luminance L* or a correction degree of brightness B, instead of the brightness value correction degree value ΔY.

B7. Modified Example 7

In the above-described embodiments, the color balance is corrected by modifying the color component values R, G and B in the RGB color space and the brightness is corrected in accordance with RGB brightness correction degree value ΔYb. However, the color balance and brightness may be corrected in other color spaces such as a color space having no brightness index value and a plurality of color component values. The correcting processes can be performed in the CMY color space, for example.

B8. Modified Example 8

In the above-described embodiments, the invention is applied to a flesh color correcting process of correcting a flesh color of a human face, a human body or the like included in an image into a preferable color. However, in addition to a flesh color correcting process, the invention may be generally applied to a memory correction process of converting a color of a specific area of an image into a memory color.

B9. Modified Example 9

In the above-described embodiments, the invention is applied to a complex machine MFP (FIG. 1). However, the invention may be applied to any image processing device that performs a memory color correcting process. For example, the invention can be also applied to an image processing device that uses a personal computer or an image display apparatus.

What is claimed is:

1. An image processing device correcting a color of a specific area in a target image into an appropriate color, the image processing device comprising:
   a computer including a central processing unit and a memory, the central processing unit executing programs stored in the memory to realize the functions of the following units;
   a target image acquiring unit acquiring the target image;
   a representative value acquiring unit acquiring a representative brightness value representing the specific area in a first color space that has a brightness index value, and acquiring a plurality of representative color component values representing the specific area in a second color space that has no brightness index value and a plurality of color component values; and
   a specific area color correcting unit correcting the color of the specific area on the basis of the representative brightness value and the representative color component values acquired by the representative value acquiring unit,
   wherein the specific area color correcting unit includes:
   a first brightness correcting section correcting brightness of the specific area by modifying the brightness index value in the first color space;
   a second brightness correcting section correcting brightness of the specific area by modifying the plurality of color component values in the second color space; and
   a brightness correction degree setting section setting a first brightness correction degree in the first brightness correcting section and a second brightness correction degree in the second brightness correcting section on the basis of the representative brightness value.

2. The image processing device according to claim 1, wherein the brightness correction degree setting section repeatedly readjusts the first brightness degree and the second brightness correction degree in accordance with a correction result of a representative color, which is expressed by the representative color component values, in the second brightness correcting section until a variation degree of a color balance of the representative color by the correcting reaches a predetermined allowable range.

3. The image processing device according to claim 2, wherein the brightness correction degree setting section sets the first brightness correction degree value to 0 in a first repeat of the readjusting.

4. The image processing device according to claim 1, wherein the specific area color correcting unit further includes:
   a color balance correction degree acquiring section acquiring a color balance correction degree used to correct a color balance while suppressing variation in brightness of the specific area, on the basis of the representative brightness value and the representative color component value; and
   a color balance correcting section correcting the color balance of the specific area in the second color space by modifying the plurality of color component values on the basis of the color balance correction degree.

5. The image processing device according to claim 1, wherein the first color space is an YCbCr color space and the brightness index value is a brightness value defined in the YCbCr color space.

6. The image processing device according to claim 1, wherein the second color space is an RGB color space and the plurality of color component values are three color component values defined in the RGB color space.

7. An image processing method of correcting a color of a specific area in a target image into an appropriate color, the image processing method comprising:
   (a) acquiring the target image;
   (b) acquiring a representative brightness value representing the specific area in a first color space that has a brightness index value;
   (c) acquiring a plurality of representative color component values representing the specific area in a second color space that has no brightness index value and a plurality of color component values; and
   (d) correcting the color of the specific area on the basis of the representative brightness value and the representative color component values,
   wherein step (d) includes:
   (d1) correcting a brightness of the specific area by modifying the brightness index value in the first color space;
   (d2) correcting a brightness of the specific area by modifying the plurality of color component values in the second color space; and
   (d3) setting a first brightness correction degree in the correcting (d1) and a second brightness correction degree in the correcting (d2) on the basis of the representative brightness value.

8. A computer program embodied in a non-transitory computer-readable medium that executes on a computer an image-processing of correcting a color of a specific area in a target image into an appropriate color, the computer program executing, on the computer:

(a) a function of acquiring the target image;
(b) a function of acquiring a representative brightness value representing the specific area in a first color space that has a brightness index value;
(c) a function of acquiring a plurality of representative color component values representing the specific area in a second color space that has no brightness index value and a plurality of color component values; and
(d) a function of correcting the color of the specific area on the basis of the representative brightness value and the representative color component values, wherein the function (d) includes:
  (d1) a function of correcting a brightness of the specific area by modifying the brightness index value in the first color space;
  (d2) a function of correcting a brightness of the specific area by modifying the plurality of color component values in the second color space; and
  (d3) a function of setting a first brightness correction degree in the function (d1) and a second brightness correction degree in the function (d2) on the basis of the representative brightness value.

* * * * *